United States Patent
Ponnachana et al.

(10) Patent No.: US 9,936,021 B1
(45) Date of Patent: Apr. 3, 2018

(54) METHODS AND SYSTEMS FOR A MULTI-FUNCTION ADAPTER

(71) Applicant: QLOGIC, Corporation, Aliso Viejo, CA (US)

(72) Inventors: Sudhir Ponnachana, Aliso Viejo, CA (US); Ajmer Singh, Rancho Santa Margarita, CA (US); Ronald B. Gregory, Lake Forest, CA (US)

(73) Assignee: Cavium, Inc., San Jose, CA (US)

( * ) Notice: Subject to any disclaimer, the term of this patent is extended or adjusted under 35 U.S.C. 154(b) by 527 days.

(21) Appl. No.: 14/530,388

(22) Filed: Oct. 31, 2014

(51) Int. Cl.
G06F 17/30 (2006.01)
H04L 29/08 (2006.01)
G06F 3/06 (2006.01)

(52) U.S. Cl.
CPC .......... *H04L 67/1097* (2013.01); *G06F 3/067* (2013.01); *G06F 17/30424* (2013.01)

(58) Field of Classification Search
CPC .. G06F 17/30424; G06F 3/067; G06F 3/0689; G06F 3/0665; G06F 3/061; G06F 3/0611; G06F 3/0641; G06F 12/0888; G06F 2009/45579; H04L 67/1097
See application file for complete search history.

(56) References Cited

U.S. PATENT DOCUMENTS

| | | | |
|---|---|---|---|
| 2010/0325376 A1* | 12/2010 | Ash ...................... | G06F 11/1438 711/162 |
| 2012/0151135 A1* | 6/2012 | Crawford ............ | G06F 11/2069 711/114 |
| 2013/0282980 A1* | 10/2013 | Bennett ................. | G06F 3/0689 711/114 |
| 2015/0363128 A1* | 12/2015 | Funaya .................. | G06F 3/061 711/114 |

* cited by examiner

*Primary Examiner* — Alexander Khong
(74) *Attorney, Agent, or Firm* — Klein, O'Neill & Singh, LLP (57) ABSTRACT

Systems and methods for storage operations are provided. As an example, a method includes configuring a non-volatile memory of a network device to be used as a storage device for storing data for an application; generating a logical storage object for the application for using storage space at the non-volatile memory of the network device to store data for the application, where the network device creates a unique identifier for the logical storage object; identifying the logical storage object as a mirror logical storage object such that data written at the non-volatile memory device is mirrored by another network device operating as a peer to the network device; providing the unique identifier to the other network device for generating a mirror logical storage object for mirroring data that is stored at the non-volatile memory; receiving a request at the network device for writing data to the non-volatile storage object; writing data at the non-volatile memory of the network device when the request identifies the network device; and mirroring the data at the other network device, when the request indicates that the data needs to be mirrored.

21 Claims, 10 Drawing Sheets

| Bit<br>Byte | 7 | 6 | 5 | 4 | 3 | 2 | 1 | 0 |
|---|---|---|---|---|---|---|---|---|
| 0 | \multicolumn{8}{c}{Operation Code (C9h) 602} |
| 1 | Version 604 |||||||| 
| 2 | 'Q' 606A |||||||| 
| 3 | 'L' |||||||| 
| 4 | 'G' |||||||| 
| 5 | 'C' 606N |||||||| 
| 6 | Reserved |||||||| 
| 7 | Descriptor Count 608 |||||||| 
| 8 | Reserved | | | | | | ServiceLocally 610 | BlkAdrFmt 612 |
| 9 | Reserved ||||||||

Vendor Unique Zero Initialize Block Command (C9h)

| Bit<br>Byte | 7 | 6 | 5 | 4 | 3 | 2 | 1 | 0 |
|---|---|---|---|---|---|---|---|---|
| 0 | (MSB) | | | | | | | |
| ⋮ | | | StartOffset | | | | | |
| 7 | | | | | | | | (LSB) |
| 8 | Reserved | | | | | | | |
| 9 | Length 618 | | | | | | | |
| 10 | Reserved | | | | | | | |
| 11 | Reserved | | | | | | | |

StartOffset 616

C9h Block Descriptor

METHODS AND SYSTEMS FOR A MULTI-FUNCTION ADAPTER

TECHNICAL FIELD

The present disclosure relates to computing systems in general and, more particularly, to methods and systems of multi-functional adapters that are used by computing systems for reading and writing information.

BACKGROUND

A computer network, often simply referred to as a network, is a group of interconnected computers and devices that facilitates communication among users and allows users to share resources. Adapters, switches, and other devices are typically used during network communication for reading and writing data at mass storage devices.

Computing devices (or systems) use mass storage devices to store data. Data centers are commonly used to store large amounts of data for computing devices. Different storage options are available for computing devices to store data and retrieve data, for example, direct-attached storage (DAS), network attached storage (NAS), and storage area networks (SANs).

A DAS system typically includes a plurality of storage drives/devices that are directly attached to a computing device (for example, a server) and are accessible via a host bus adapter (HBA). Common protocols used for DAS storage devices are SCSI (Small Computer Systems Interface), ATA (AT attachment), SATA (Serial ATA), SAS (Serial Attached SCSI), and others.

NAS is file-level storage that provides access to a plurality of computing devices. NAS typically uses network file sharing protocols, for example, NFS (Networked File System), CIFS (Common Internet File System) and others for storing and managing data at storage devices.

A SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through a local area network. SANs often use a Fibre Channel fabric topology, an infrastructure specially designed to handle storage communications. SANs may also use iSCSI (that maps SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet), and other protocols for storing data at storage devices.

Continuous efforts are being made to improve the functionality of adapters used by computing systems for providing access to storage space for reading and writing information.

BRIEF DESCRIPTION OF THE DRAWINGS

The present aspects relating to the management of network elements now will be discussed in detail with an emphasis on various advantageous features. These novel and non-obvious aspects are depicted in the accompanying drawings, which are for illustrative purposes only. These drawings include the following figures, in which like numerals indicate like parts.

DETAILED DESCRIPTION

The following detailed description describes the present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware-based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The aspects disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

Figure 1A:
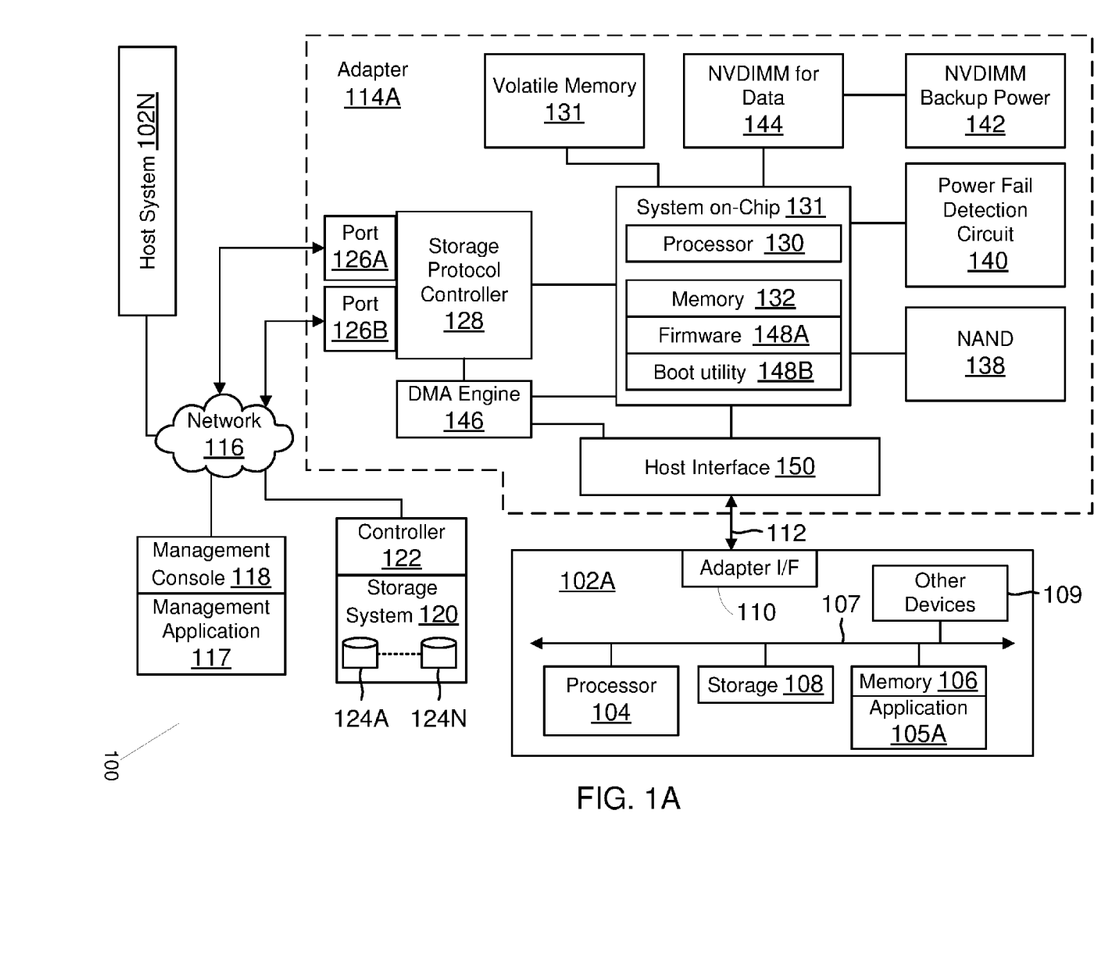
FIG. 1A is a functional block diagram of a system showing a multi-functional adapter, according to one aspect of the present disclosure.

System 100: FIG. 1A is a block diagram of a system 100 having a multi-function adapter (may also be referred to as an adapter or a device) 114A, according to one aspect of the present disclosure. System 100 may also include a plurality of computing systems, such as computing system 102A and computing system 102N (may also be referred to as server(s) 102 or host system(s) 102), a management console 118, and a storage system 120 coupled by a network 116, as described below in more detail.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine-implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, a PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

The host system 102A may further include a storage device 108, which may include, for example, a hard disk (HDD), a CD-ROM, a non-volatile memory device (flash or memory stick), a hybrid drive (sometimes referred to as SSHD), or any other storage device for storing structured or unstructured data. Storage 108 may store operating system program files (or data containers), application program files, for example, e-mail applications, database applications, management applications, and other application files. Some of these files are stored in storage 108 using an installation program. For example, the processor 104 may execute computer-executable process steps of an installation program so that the processor 104 can properly execute the application program.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as startup instruction sequences or basic input/output system (BIOS) sequences for operation of a keyboard (not shown).

In one aspect, processor 104 may execute an application 105A for performing certain functions. For example, application 105A may be a database application, a virtual machine executed in a virtual environment (provided by VMware Corporation, Microsoft Corporation or any other entity), electronic e-mail application (for example, Microsoft Exchange), or any other application type. Application 105A may issue read and write requests (also referred to as input/output (I/O) requests) that are processed by adapter 114A, as described below in more detail. Application 105A may also be referred to as a "client."

The host system 102A also includes other devices and interfaces 109, which may include a display device interface, a keyboard interface, a pointing device interface, and others. The details of these components are not germane to the inventive aspects disclosed herein.

Adapter 114A may be configured to handle both network and storage traffic while interfacing with other elements. In one aspect, as described below in detail, adapter 114A may be configured to provide the functionality of a HBA by providing connectivity to SAN-based storage arrays. Various network and storage protocols may be used to handle network and storage traffic, for example, Ethernet, Fibre Channel, FCoE, iSCSI, and others. Some of the common protocols are described below.

Ethernet is a common network protocol used for network communication. The original Ethernet bus or star topology was developed for LANs to transfer data at 10 Mbps (megabits per second). Newer Ethernet standards (for example, Fast Ethernet (100 Base-T) and Gigabit Ethernet) support data transfer rates that are greater than 1 gigabit (Gb). The various aspects described herein may use Ethernet (which includes 100 Base-T and/or Gigabit Ethernet) as the network protocol. However, the adaptive aspects disclosed herein are not limited to any particular protocol, as long as the functional goals are met by an existing or new network protocol.

Fibre Channel (may also be referred to as "FC") is a common storage protocol used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called FCoE has been developed to handle both Ethernet and Fibre Channel traffic in a SAN. This functionality would allow Fibre Channel to leverage high speed, for example, 10 Gigabit Ethernet networks while preserving the Fibre Channel protocol. In one aspect, adapter 114A can be configured to operate as a FCOE adapter. Those of ordinary skill in the art will appreciate, however, that the present aspects are not limited to any particular protocol.

iSCSI is an IP-based storage networking standard for linking data storage facilities. By carrying SCSI commands over IP networks, iSCSI is used to facilitate data transfers over intranets and to manage storage over long distances. iSCSI can be used to transmit data over LANs, wide area networks (WANs), or the Internet and can enable location-independent data storage and retrieval. The protocol allows clients to send SCSI commands (referred to as command or (control) data blocks (CDBs)) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one aspect, adapter 114A may operate as an initiator as well as a target for responding to input/output (referred to as I/O or IO) requests for reading and writing information at storage devices.

Storage space at a storage device (local or SAN-based) is typically presented to application 105A as a logical entity referred to as a logical unit number (LUN). Each LUN is uniquely identified by an identifier (LUN ID) and is associated with physical storage space. A LUN has a size associated with it that may indicate the amount of storage space that is made available to a computing system and a drive letter that may be used to access the LUN.

A LUN is typically divided into logical block addresses (LBAs) that are used by application 105A to read and write data to storage locations. The LBAs are mapped with actual physical storage to read and write data. A LUN used by an application may be referred to as a data LUN. A LUN that is accessible via a SAN connection may be referred to as a SAN LUN.

Storage space at a storage device may also be configured to operate as a flat address space. In that case, an offset value is used to determine where data is to be stored. The various aspects described herein are for LUN-based and flat address space storage configurations.

Referring back to FIG. 1A, computing system 102 uses an adapter interface 110 to communicate with adapter 114A via a link 112. In one aspect, link 112 may be a PCI-Express link or any other interconnect type. The adaptive aspects disclosed herein are not limited to any particular link type.

Adapter 114A may communicate and interface with a mass storage system 120 via network 116 that may include one or more switches (may be referred to as fabric switches). The mass storage system 120 may include a plurality of storage devices 124A-124N. Storage space at storage devices 124A-124N may be presented as SAN LUNs to application 105A via network 116. Controller 122 of mass storage system 120 may be used to manage storage devices 124A-124N. In one aspect, controller 122 may include a processor, an adapter 114A and other similar components.

As mentioned above, system 100 may also include the management console 118, used according to one aspect. Management console 118 may be a computer system similar to computing system 102A, described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. Permissions associated with a LUN may also be configured using management application 117. The permissions indicate which entities may be allowed to access a LUN to read and/or write information. Management application 117 may store LUN attributes and permissions in a configuration data structure at a storage location.

In one aspect, adapter 114A includes a storage protocol controller 128 (also referred to as a "protocol interface" or "protocol controller") with ports 126A and 126B. The storage protocol controller 128 may be a Fibre Channel controller (or application specific integrated circuit (ASIC)) that can interface with Fibre Channel based storage devices/systems. Ports 126A/126B include logic and circuitry for sending and receiving Fibre Channel frames. Fibre Channel is simply shown as an example and the various aspects disclosed herein are not limited to any particular storage/network protocol. Thus ports 126A-126B are not limited to just Fibre Channel ports. Furthermore, although only two ports 126A and 126B are shown as an example, the adaptive aspects disclosed herein are not limited to any particular number of ports. Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage.

In one aspect, storage protocol controller 128 includes a processor (not shown) or any other hardware device for executing the Fibre Channel stack having layers FC0-FC4. FC0 is defined by the Fibre Channel specification as the physical layer, which includes cables (fiber optics, twisted-pair), connectors, and others. The FC1 layer is defined as the data link layer. This layer implements the 8B/10B encoding and decoding of signals. The FC2 layer is defined as the network layer. This layer defines the main Fibre Channel framing, addressing, and control protocols. The FC3 layer is an auxiliary layer that provides common services like encryption or RAID related services. The FC4 layer is the protocol mapping layer where other protocols, such as SCSI, are encapsulated into an information unit for delivery to FC2 and transmission across a Fibre Channel network. This layer provides flexibility to Fibre Channel as a networking technology compatible with other technologies.

Adapter 114A also includes a host interface 150 that interfaces with processor 104 via link 112. The structure of host interface 150 depends on the type of connection/interconnect used to communicate with processor 104. For example, if a PCI-Express link is used to communicate with processor 104, then host interface 150 includes logic and circuitry for receiving and sending PCI-Express packets/information.

Adapter 114A includes a system-on-chip (SOC) 131 that includes a processor 130 having access to an adapter memory (may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions 148A and various data structures for adapter 114A for controlling overall adapter 114A operations. Memory 132 may also store boot utility instructions 148B that is used to boot and initialize adapter 114A, as described below in more detail.

In one aspect, both firmware 148A and boot utility 148B are executed within the context of an operating system for the adapter 114A. The operating system may be based on a Linux kernel or any other operating system type.

Adapter 114A may also include a receive module and a transmit module at storage protocol controller 128. The receive module may be used to store packets that are received via ports 126A/126B, while transmit module may be used to store information that is transmitted via ports 126A/126B or to a local Non-Volatile memory 144, as described below in more detail. Receive module and/or transmit module may be separate modules and may include more than one component for processing received information or information that is transmitted.

Adapter 114A may also include a non-volatile memory 138 (shown as NAND flash memory) for storing parameters/instructions that may be used by micro-processor 130 for executing the instructions described below in detail.

Additional non-volatile memory for data (shown as NVDIMM (non-volatile dual in-line memory module) 144 of adapter 114A may be used as a SCSI block device or as a flat address space for the host system to store data. The NVDIMM 144 may be configured to accept words or blocks of data. The NVDIMM 144 may be used to store data which can be restored when there is a power failure. In another aspect, the NVDIMM 144 may be configured to operate as a mirror LUN between two adapter pairs. In another aspect, NVDIMM 144 may be used as a caching device.

Adapter 114A further includes a back-up power module 142 for NVDIMM 144 that is triggered when a power fail circuit 140 detects a power failure. The backup power 142 is used to power NVDIMM 144 until the main system power is restored.

In conventional systems, the non-volatile memory is typically used to control the power fail circuit and is used when there is a power failure. In a dual, high-availability system, host systems have to replicate user data to a peer host. This requires significant computing power and memory. The various aspects described herein offload the replication operation to adapter 114A using NVDIMM 144, as described below in detail.

Figure 1B:
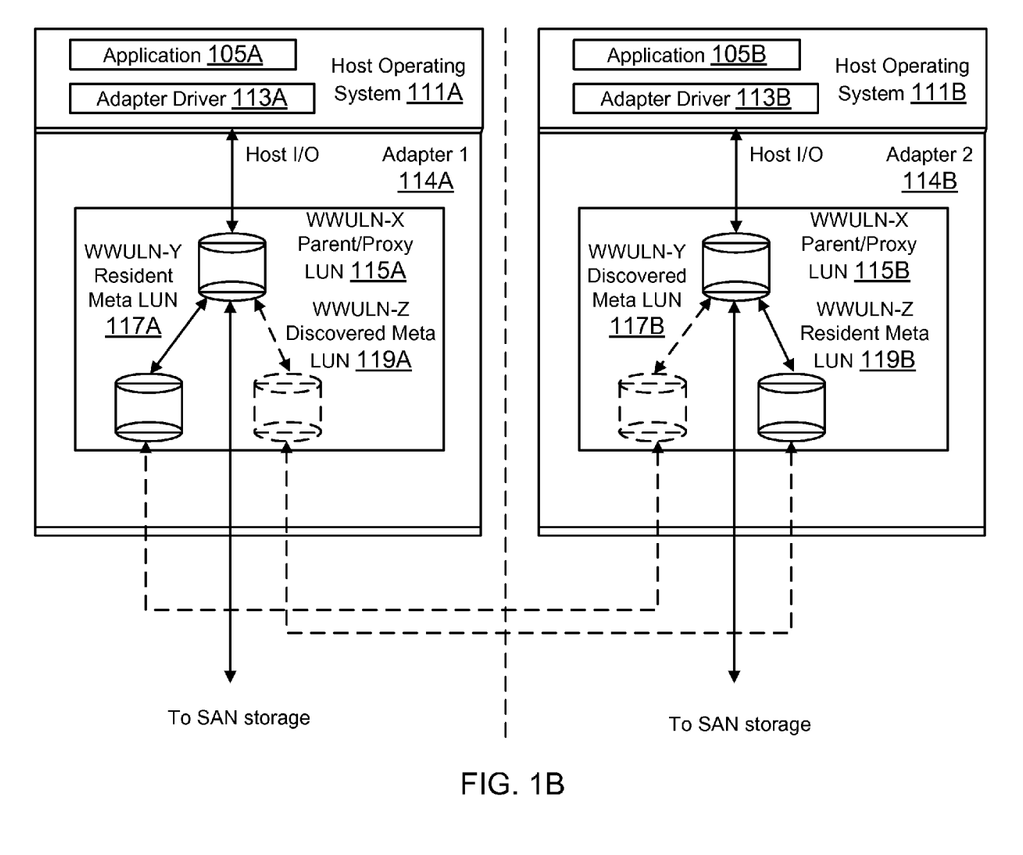
FIG. 1B shows an example of logical unit number (LUN) object creation, according to one aspect.

FIG. 1B shows a block diagram where two host systems 102A/102B use adapters 114A/114B to mirror data at NVDIMM 144 of each adapter. Hosts systems 102A and 102B each execute an adapter driver 113A/113B respectively, to interface with adapters 114A/114B. The adapter drivers are executed within the operating systems 111A/111B in an aspect.

Applications 105A and 105B executed at host systems 102A and 102B, respectively are similar. Adapters' 114A-114B are also similar and may be configured to operate as peer adapters so that write data at one adapter is mirrored at the other adapter.

Storage space at NVDIMM 144 of adapter 114A may be presented as a parent/proxy LUN to application 105A. Similarly, LUN 115B based on storage space managed by adapter 114B may be presented to application 105B by adapter 114B. A Meta-LUN 117A that is associated with proxy LUN 115A is created at adapter 114A. A mirror 117B of the Meta-LUN 117A is created by adapter 114B using NVDIMM storage space at adapter 114B. Adapter 114A uses the meta-LUN 117A to write to the proxy LUN and to store metadata regarding the proxy LUN.

A Meta-LUN 119B associated with proxy LUN 115B is created at adapter 114B. A mirror 119A of the Meta-LUN 119B is created by adapter 114A using NVDIMM storage space managed by adapter 114A. Adapter 114B uses the Meta-LUN 119B to write to the proxy LUN 115B and to store metadata regarding the proxy LUN 115B.

The Meta-LUN 117A (or 119B) is not exposed to application 105A (or application 105B) and instead is an internal logical object used by adapter 114A. Meta-LUN 117B is a replica of Meta-LUN 117A at adapter 114B, while Meta-LUN 119A is a replica of Meta-LUN 119B at adapter 114A. The use of these various LUN types is described below in detail.

Figure 2A:
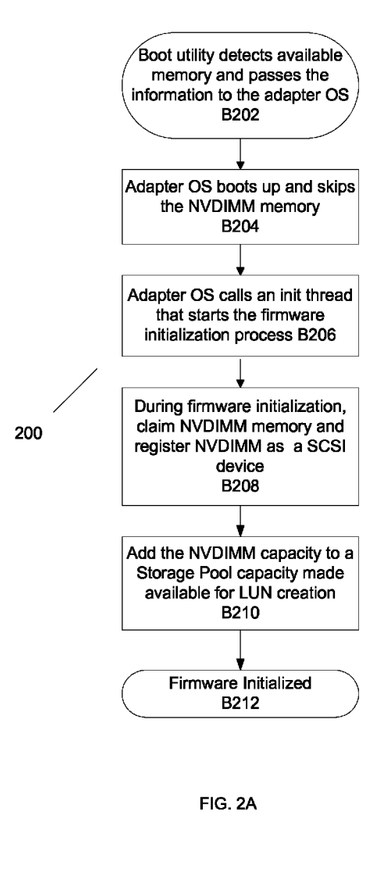
FIGS. 2A-2B show process flow diagrams for configuring a non-volatile memory of an adapter for usage as a data LUN, according to one aspect of the present disclosure.

Process Flow: FIG. 2A shows a process flow 200 for configuring NVDIMM 144 as a block-level storage device, for example, a block level SCSI storage device. Although the process blocks have been described with respect to adapter 114A, they are equally applicable to adapter 114B. The process begins when in block B202, boot utility 148B of adapter 114A detects NVDIMM 144 as part of a configuration routine. As mentioned above, firmware 148A and boot utility 148B may be executed within an operating system kernel of adapter 114A. The boot utility 148B provides memory information to the operating system kernel of adapter 114A.

In block B204, the operating system kernel is initialized but it skips the NVDIMM memory from initialization. The adapter 114A operating system calls an initialization (or init) thread that begins firmware initialization. The operating system kernel then claims NVDIMM 144 in block B208 and registered as a SCSI storage device with firmware 148A.

In block B210, firmware 148A (or a component of firmware 148A, for example, a Storage Pool Manager (not shown) that is used to manage storage on behalf of firmware 148A) adds a storage capacity of NVDIMM 144 to an available storage capacity that may be maintained. The available storage capacity information may be stored at the NAND 138. Thereafter, in block B212, the firmware 148A is initialized and the NVDIMM 144 is ready to be used as a SCSI storage device for storing information for write requests.

Figure 2B:
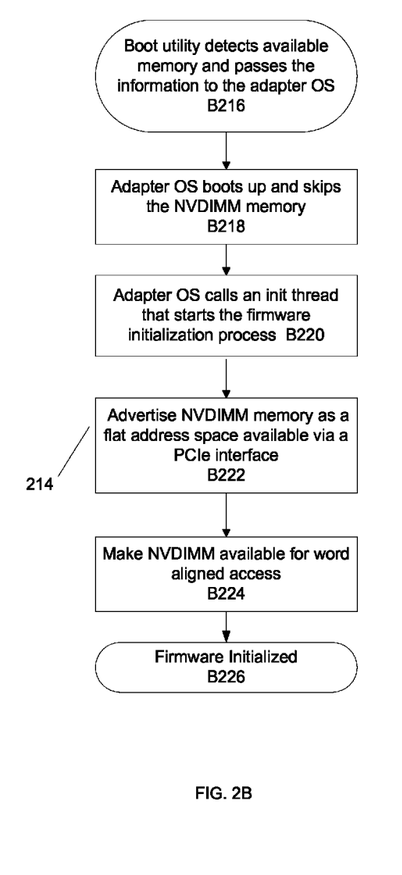

FIG. 2B shows a process 214 for configuring NVDIMM 144 as a flat address space storage device. The various process blocks of process 214 are similar to process 200. For example, block B216 is similar to block B202, block B218 is similar to block B204 and block B220 is similar to block B206.

In block B222, firmware 148A advertises NVDIMM 144 as a flat address space to host system 102A, for example, to processor 104. Thereafter, in block B224, NVDIMM 144 is available for word aligned access and the firmware 148A is initialized and the device is available for use in block B226.

Figure 3:
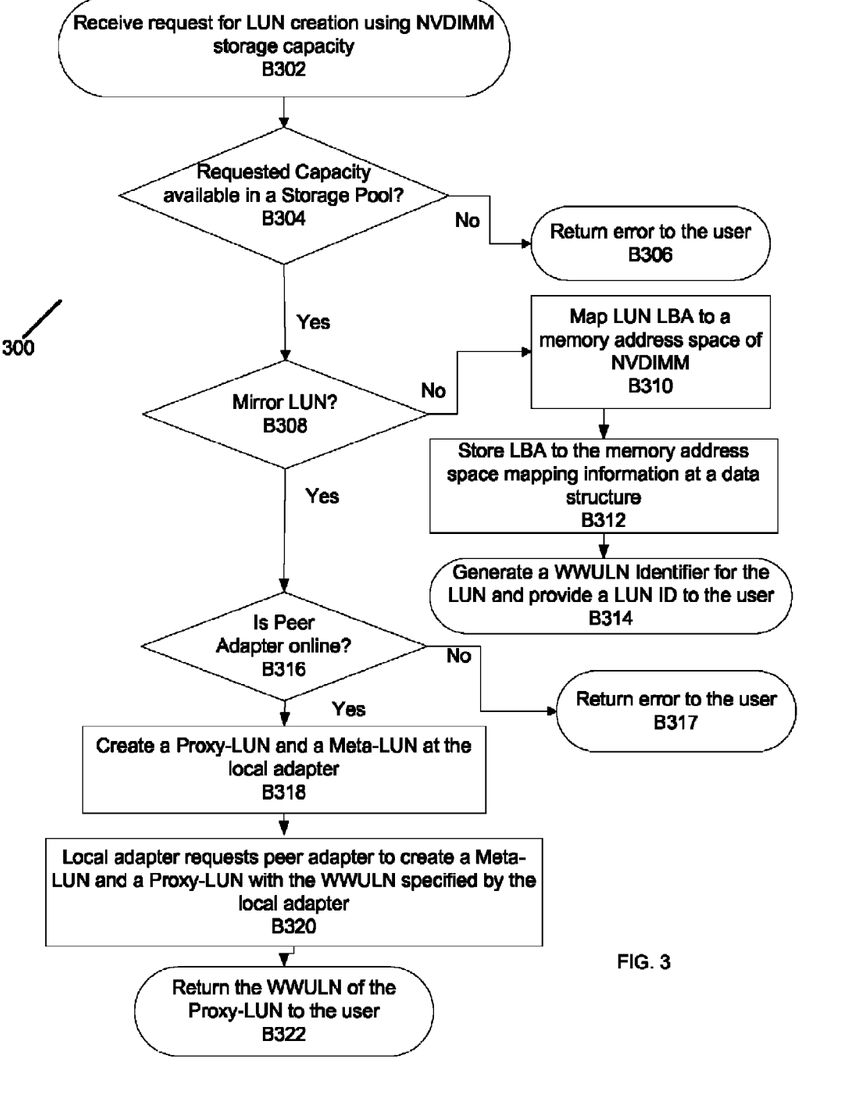
FIG. 3 shows a process for creating a LUN, according to one aspect.

FIG. 3 shows a process 300 for using NVDIMM 144 capacity as block storage, according to one aspect of the present disclosure. The process begins in block B302, when a user requests LUN creation. The user request is provided to the firmware 148A. As an example, the user may be an application 105A executed at host 102A or any other system. Firmware 148A provides a management interface to the application 105A executed by processor 104 to display storage pool information (i.e. total available storage capacity and used storage capacity).

In block B304, firmware 148A determines if the requested storage capacity is available within the storage pool. If not, then an error is returned to the user in block B306. If storage capacity is available, then, in block B308, the firmware 148A determines if the user request is for a mirror LUN. If not, then in block B310, firmware 148A maps the LBA for the LUN to the NVDIMM memory address space. The mapping information may be stored in a data structure in block B312. The data structure may be stored at persistence storage, for example, NAND 138. In block B314, a unique identifier, for example, in a NAA (National Address Authority) format is generated for the LUN and provided to the user. As an example, the LUN identifier may be a worldwide unique LUN identifier (WWULN) (for example, 6001-B320-3030-3032-0024-FF5B-CFC2-2020).

If the LUN is a mirror LUN as determined in block B308, then in block B316, adapter 114A determines if a peer adapter (for example, 114B) for the mirror LUN is online, i.e. is available. If not, then an error is returned in block B317. If the peer adapter 114B is online, then, in block B318, adapter 114A creates a proxy LUN 115A and a Meta-LUN 117A at adapter 114A. In block B320, the adapter 114A requests the peer adapter to create a Meta-LUN and a Proxy-LUN with the WWULN specified by adapter 114A. As described above, Meta-LUN 117B corresponds to the Meta-LUN 117A that is owned and managed by adapter 114A. Proxy LUN 115B may be the mirror LUN for the Proxy LUN 115A with the same WWULN. Thereafter, the WWULN of the proxy-LUN is returned to the user application, in block B322.

Figure 4A:
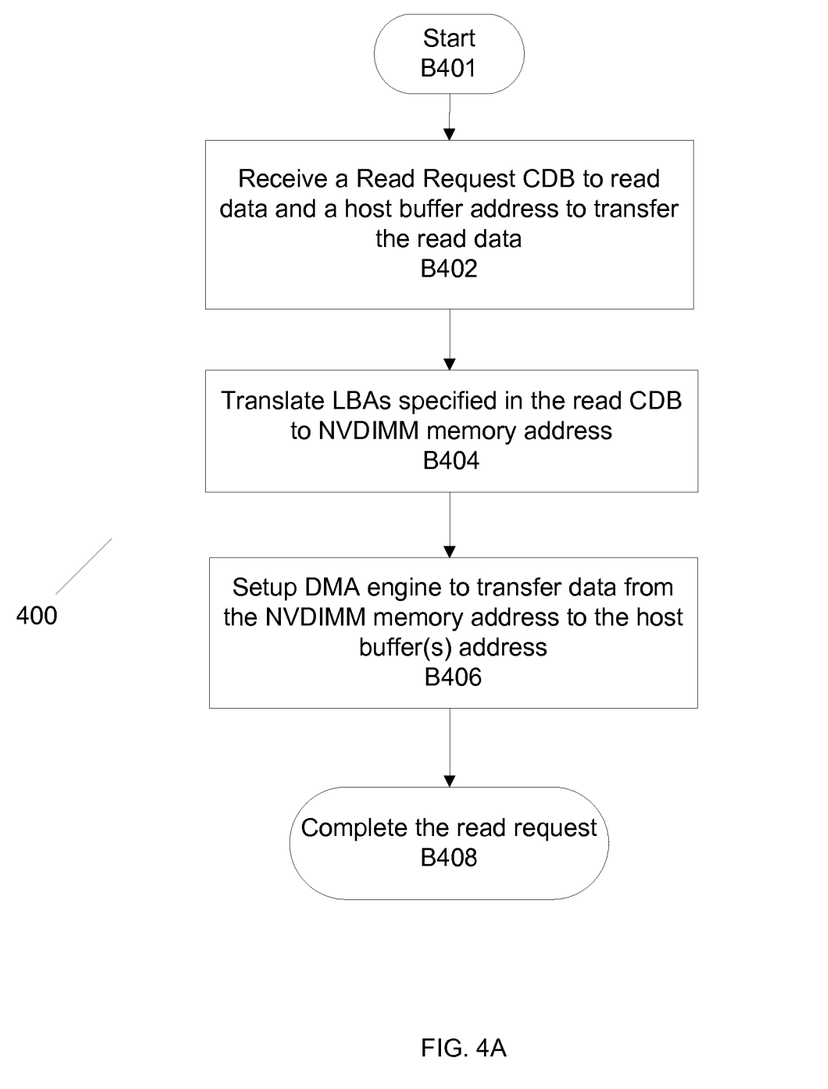
FIGS. 4A-4B show process flow diagrams for a read operation, according to one aspect of the present disclosure.

FIG. 4A shows a process 400 for executing a read operation, when NVDIMM 144 is configured as a block storage device. The process begins in block B401, when host system 102A and adapter 114A are initialized and operational. In block B402, adapter 114A receives a read request CDB and a host memory buffer address to transfer data to after the data is acquired per the read request. The host memory buffer address specifies a host memory location to where adapter 114A can transfer data using a DMA operation, after the data is retrieved.

In block B404, the adapter firmware 148A translates the LBA specified in the read request CDB to the memory address of the NVDIMM 144. The adapter 114 maintains the translation data structure that maps LBAs to the address space of the NVDIMM 144.

In block B406, the DMA engine 146 is setup to transfer the data from the NVDIMM 144 to the host memory buffer address. Thereafter, the process ends in block B408.

Figure 4B:
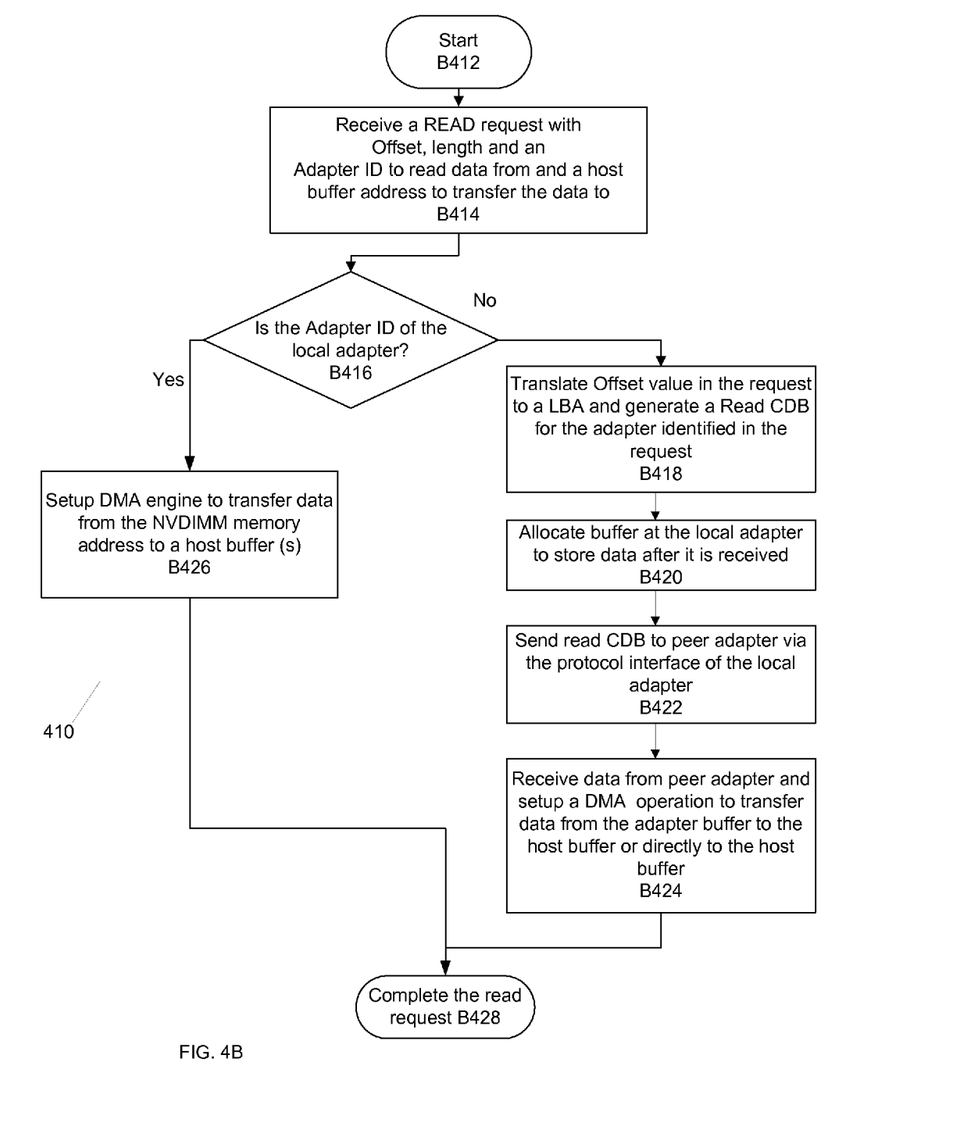

FIG. 4B shows a process 410 for reading data when the NVDIMM 144 is configured as a flat address space, according to one aspect. The process begins in block B412, when host 102A and adapter 114A are operational and initialized. In block B414, adapter 114A receives a request to read data. The request specifies an offset value and a length for reading the data. The request also specifies an adapter identifier that identifies an adapter and a host memory address from where data is to be read by the adapter 114. The request may be from application 105A at host system 102A or from an application executed at another host system.

In block B416, firmware 148A checks the adapter identifier to see if the request is for itself. If not, then in block B418, adapter 114A translates the memory offset to the LBA of specified in the request and a read CDB is generated by firmware 148A for the adapter identified by the adapter ID in block B414. In block B420, adapter 114A allocates a buffer for the data after data is received from the identified adapter. In block B422, protocol controller 128 of adapter 114A is used to issue a read CDB for the peer adapter identified by the adapter ID. In block B424, the peer adapter sends the data to the requesting adapter 114A. The data is stored at the buffer allocated in block B420. Thereafter, the data is transferred via link 112 to the host memory buffer at the specified host buffer address of the original read request. It is noteworthy that the data may be transferred directly to the host memory by adapter 114A without having to use the buffers of block B420. The read request is then completed in block B428.

If the adapter identifier is that of the local adapter 114A (as determined in block B416), then in block B426, the DMA engine 146 is setup to transfer the data from NVDIMM 144 to the host memory buffer; the DMA engine thereafter carries out the transfer. The process then moves to block B428, when the read request is completed.

Figure 5A:
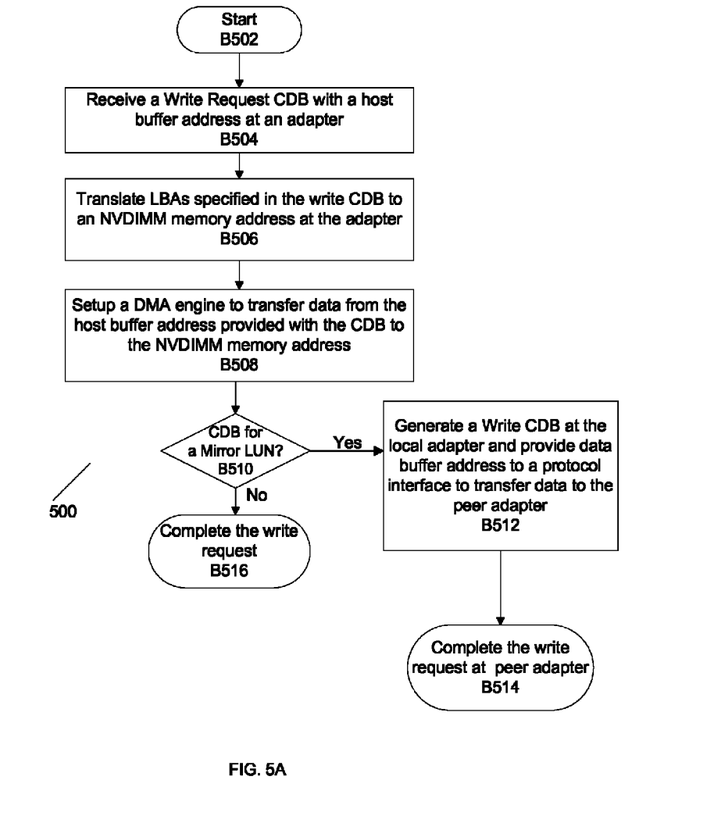
FIGS. 5A-5B show process flow diagrams for a write operation, according to one aspect of the present disclosure.

FIG. 5A shows a process 500 to write to NVDIMM 144 configured as a block level storage device, according to one aspect. The process begins in block B502, when the host 102A and adapter 114A are initialized. In block B504, a write request CDB is received by adapter 114A. The adapter 114A also receives a host buffer memory address from where data is to be retrieved by the adapter 114A. The CDB may be generated by the host system 102A, for example, application 105A and/or the adapter driver 113A.

In block B506, the LBAs specified in the CDB are translated to an NVDIMM 144 address. Adapter 114A firmware 148A maintains a mapping for the LBAs and the NVDIMM 144 addresses. In block B508, firmware 148A sets up DMA engine 146 to transfer data from the host memory buffer to the NVDIMM 144 address location.

In block B510, adapter 114A determines if the write CDB is for a mirror LUN, i.e. if the data has to be mirrored. This is determined by a flag or an indicator provided in the CDB. This may also be determined by adapter 114A using a data structure that identifies LUNs that are mirrored. If yes, then in block B512, adapter 114A generates a write CDB and provides an address of the NVDIMM 144 to the protocol controller 128 to transfer the data and the CDB to the peer adapter (for example, 114B). Thereafter, the write operation is completed by the peer adapter in block B514 and adapter 114A is notified of the write completion. If the CDB is not for a mirror LUN then the I/O request is completed in block B516 and the process ends.

Figure 5B:
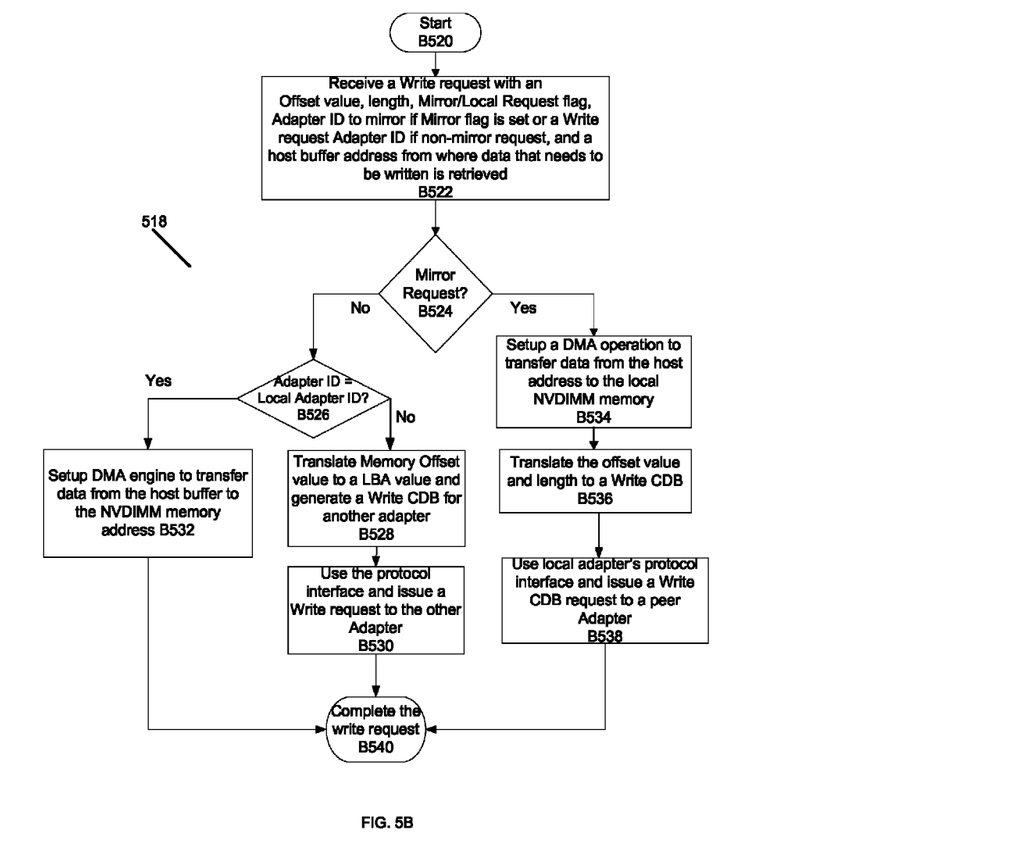

FIG. 5B shows a process 518 for executing a write operation, when the NVDIMM 144 is configured as a flat address space, according to one embodiment. The process begins in block B520 when host system 102A and adapter 114A are initialized and operational. In block B522, a write request is received by adapter 114A. The write request specifies an offset value and a length. The request also includes a flag indicating if the data needs to be mirrored by another peer node. The request also identifies the peer adapter with a peer adapter identifier for a mirror operation. The request further specifies a host buffer address value from where data is it be transferred for the write request. The write request further identifies the adapter that needs to execute the write request.

In block B524, the adapter 114A, examines the write request and determines if the write request has to be mirrored. For example, adapter 114A determines if the mirror flag is set. If the mirror flag is not set, then in block B526, the adapter 114A determines if the adapter identifier in the request is for the local adapter 114A. If not, then in block B528, the memory offset is translated to a LBA of a LUN that is managed by the adapter identified by the adapter ID in the write request. Adapter 114A then generates a write CDB for the adapter specified by the write request.

In block B530, the write CDB is issued to the adapter identified in the write request. In an aspect, the protocol controller 128 sends the CDB. Thereafter, the identified adapter completes the write request and notifies adapter 114A of the completion in block B540.

If the adapter identifier identifies adapter 114A, then in block B532, the DMA engine 146 of adapter 114A is setup, and the DMA engine coordinates transfer of data from the host memory buffer to the NVDIMM memory address.

Referring back to block B524, if the write request has a mirror flag set, then in block B534, a DMA operation is setup to transfer data from the host memory to the local NVDIMM 144 of adapter 114A. In block B536, the offset and length value in the request is translated to a write CDB. In block B538, using the protocol controller 128, a write CDB is issued to a peer adapter to mirror the data. The process then moves to block B540 that is described below.

Figure 6A:
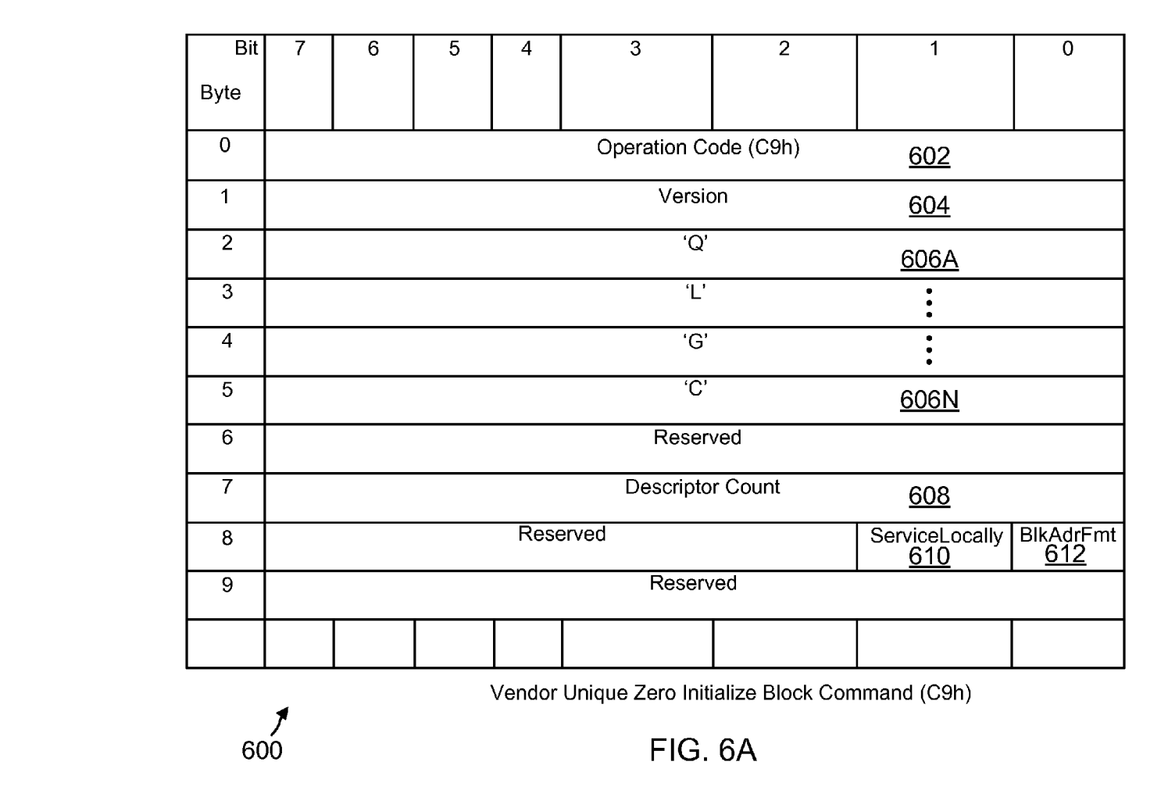
FIG. 6A shows an example of block initialization command, according to one aspect of the present disclosure.

FIG. 6A shows a vendor specific/unique CDB (VUCDB) 600 (also referred to as "C9h") that can be used to zero initialize a given block or blocks. A block may be 4 bytes (Word) or 512 Bytes for example. The CDB provides a mechanism to the host to zero initialize specified blocks. This CDB is a Write Type CDB, for example, a 10 byte CDB. The CDB defines the number of descriptors that are valid in an input buffer. Each entry in the input buffer is in the format described below:

Operation Code 602: The operation code provides a start offset value and a length value, described below with respect to FIG. 6B.

Version 604: This field defines the VU CDB implementation version.

Signature 606: This field is provided to insert a vendor unique signature, for example, Bytes 2 through 5 may have hexadecimal values equivalent of 'QLGC', indicating that the adapter is provided by QLogic Corporation, the assignee of this application.

Figure 6B:
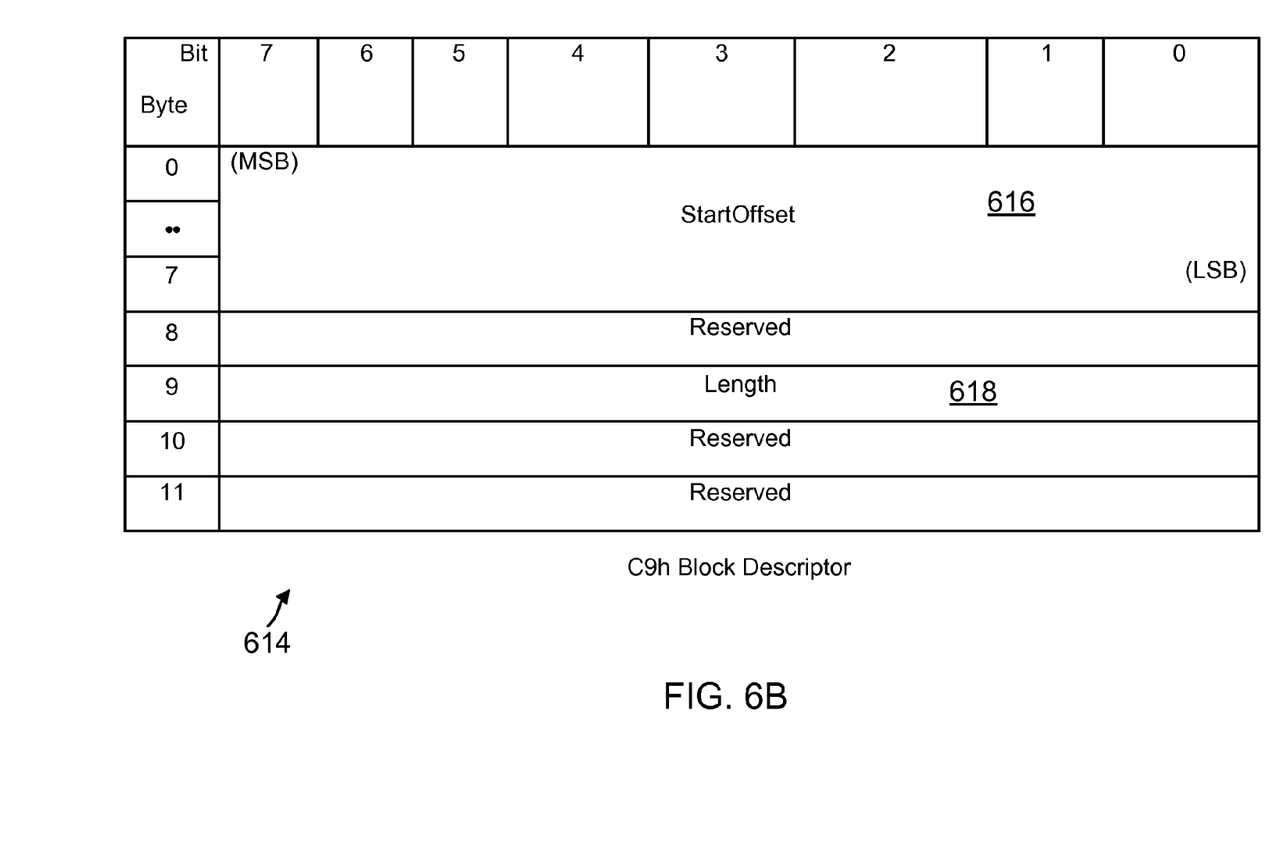
FIG. 6B shows an example of a block descriptor, according to one aspect of the present disclosure.

Descriptor Count 608: This field defines the number of valid descriptors that for aq given CDB (for example, 600). A value of Zero indicates 256 descriptors. FIG. 6B provides an example for the format of a Block Descriptor.

ServiceLocally 610: ServiceLocally is a flag set, when set to a value, for example, 1, specifies that the I/O Request specified by the CDB has to be serviced locally by the command server that received it (for example, adapter 114A). This bit set to another value, for example, zero, specifies that the command server is allowed to service the request as found appropriate by its logic. This request is applicable to all block descriptors specified by the CDB. This bit alters the behavior of the I/O requests to Mirror LUNs only.

BlkAdrFmt 612: BlkdAdrFmt field specifies the addressing method for the I/O defined in the descriptor. This bit when set to a value, for example, zero, specifies that the request is addressed as words (32-bit). This bit, when set to another value, for example, 1, specifies that the request is addressed as 512-byte block.

FIG. 6B shows an example 614 of a block descriptor C9h, i.e. for the operation code 602. As mentioned above, the number of block descriptors is provided by the block descriptor count 608. The block descriptor 614 includes:

StartOffset 616: The StartOffset field specifies the start offset of the request. If the BlkAdrFmt bit is set to, for example, zero, then this field is addressed in words (32-bit). If the BlkAdrFmt bit is set to, for example, one, then this field is addressed in 512-byte blocks. If the specified value exceeds the capacity of the medium, then the target device terminates the command with CHECK CONDITION status with the sense key set to ILLEGAL REQUEST and the additional sense code set to LOGICAL BLOCK ADDRESS OUT OF RANGE. If any one entry in the list of block descriptors is not aligned as per the BlkAdrFmt then request is terminated with Check condition status with Sense Key set to Illegal Request and ASC/ASCQ set to invalid field in parameter list.

Length 618: The Length field specifies the length of the request. If the BlkAdrFmt bit is set to, for example, zero, then this field is addressed in words (32-bit). If the BlkAdrFmt bit is set to for example, one then this field is addressed in 512-byte blocks. If the specified value exceeds the capacity of the medium, then the target device shall terminate the command with CHECK CONDITION status with the sense key set to ILLEGAL REQUEST and the additional sense code set to LOGICAL BLOCK ADDRESS OUT OF RANGE.

As described above, a local non-volatile memory of an adapter can be used as a storage device for storing information for applications. The use of the non-volatile memory can vary for different applications. The non-volatile memory may also be used for caching.

Although the present disclosure has been described with reference to specific aspects, these aspects are illustrative only and not limiting. For example, although the description above has been described with respect to an adapter, any other device may be configured to perform the foregoing function. Thus the term adapter and device are interchangeable. Many other applications and aspects of the present disclosure will be apparent in light of this disclosure and the following claims. References throughout this specification to "one aspect" or "an aspect" means that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

What is claimed is:

1. A machine-implemented method, comprising:
configuring a non-volatile memory of a first adapter to be used as a storage device for storing data for an application executed by a computing device coupled to the first adapter using a first peripheral link;
generating by the first adapter, a logical storage object for the application for using storage space at the non-volatile memory of the first adapter to store data for the application;
creating a unique identifier for the logical storage object by the first adapter;
identifying the logical storage object as a mirrored logical storage object such that data written at the non-volatile memory device by the first adapter is mirrored by a second adapter coupled to another computing device by a second peripheral link, the second adapter communicating with the first adapter using a network connection via a network link and operating as a peer of the first adapter;
providing by the first adapter, the unique identifier to the second adapter for generating a mirror logical storage object by the second adapter for mirroring data that is stored at the non-volatile memory of the first adapter using the logical storage object;
receiving a write request at the first adapter for writing data to the non-volatile storage object;
writing data at the non-volatile memory of the first adapter when the request identifies the first adapter;
mirroring the data at the second adapter using the mirror logical storage object at the second adapter, based on a write command data block generated by the first adapter and transmitted to the second adapter, when the request indicates that the data be mirrored;
receiving a read request at the first adapter to read stored data;
determining by the first adapter from the read request that the read request identifies the second adapter;
generating a read command data block by the first adapter for the second adapter to retrieve the stored data from the second adapter; and
providing the stored data to the computing device by the first adapter after receiving the stored data from the second adapter.

2. The method of claim 1, wherein, the write request includes a flag indicating that the data be mirrored at the second adapter.

3. The method of claim 1, wherein, when the non-volatile memory is configured as a flat address space, then an offset value in the write request is translated to a logical block address for the first adapter identified by the write request.

4. The method of claim 1, wherein the non-volatile memory is configured as a block storage device.

5. The method of claim 1, wherein the non-volatile memory is configured as a flat address space.

6. The method of claim 1, wherein the logical storage object is a logical unit number (LUN) that is presented to the application.

7. The method of claim 1, wherein the first adapter is configured to handle both network and storage traffic.

8. A non-transitory, machine readable storage medium storing executable instructions, which when executed by a machine, causes the machine to perform a method, the method comprising:

configuring a non-volatile memory of a first adapter to be used as a storage device for storing data for an application executed by a computing device coupled to the first adapter using a first peripheral link; wherein the first adapter detects the non-volatile memory during a configuration;

generating by the first adapter, a logical storage object for the application for using storage space at the non-volatile memory of the first adapter to store data for the application;

creating a unique identifier for the logical storage object by the first adapter;

identifying the logical storage object as a mirrored logical storage object such that data written at the non-volatile memory device by the first adapter is mirrored by a second adapter coupled to another computing device by a second peripheral link, the second adapter communicating with the first adapter using a network connection via a network link and operating as a peer of the first adapter;

providing by the first adapter, the unique identifier to the second adapter for generating a mirror logical storage object by the second adapter for mirroring data that is stored at the non-volatile memory of the first adapter using the logical storage object;

receiving a write request at the first adapter for writing data to the non-volatile storage object;

writing data at the non-volatile memory of the first adapter when the request identifies the first adapter;

mirroring the data at the second adapter using the mirror logical storage object at the second adapter at the second adapter, based on a write command data block generated by the first adapter and transmitted to the second adapter, when the request indicates that the data be mirrored;

receiving a read request at the first adapter to read stored data;

determining by the first adapter from the read request that the read request identifies the second adapter;

generating a read command data block by the first adapter for the second adapter to retrieve the stored data from the second adapter; and providing the stored data to the computing device by the first adapter after receiving the stored data from the second adapter.

9. The machine readable storage medium of claim 8, wherein, the write request includes a flag indicating that the data be mirrored at the second adapter.

10. The machine readable storage medium of claim 8, wherein, when the non-volatile memory is configured as a flat address space, then an offset value in the write request is translated to a logical block address for the first adapter identified by the write request.

11. The machine readable storage medium of claim 8, wherein the non-volatile memory is configured as a block storage device.

12. The machine readable storage medium of claim 8, wherein the non-volatile memory is configured as a flat address space.

13. The machine readable storage medium of claim 8, wherein the logical storage object is a logical unit number (LUN) that is presented to the application.

14. The machine readable storage medium of claim 8, wherein the first adapter is configured to handle both network and storage traffic.

15. A system comprising:

a memory containing machine readable medium comprising machine executable code having stored thereon instructions; and a processor module coupled to the memory, the processor module configured to execute the machine executable code to:

configure a non-volatile memory of a first adapter to be used as a storage device for storing data for an application executed by a computing device coupled to the first adapter using a first peripheral link;

generate by the first adapter, a logical storage object for the application for using storage space at the non-volatile memory of the first adapter to store data for the application;

create a unique identifier for the logical storage object by the first adapter;

identify the logical storage object as a mirrored logical storage object such that data written at the non-volatile memory device by the first adapter is mirrored by a second adapter coupled to another computing device by a second peripheral link, the second adapter communicating with the first adapter using a network connection via a network link and operating as a peer of the first adapter;

provide by the first adapter, the unique identifier to the second adapter for generating a mirror logical storage object by the second adapter for mirroring data that is stored at the non-volatile memory of the first adapter using the logical storage object;

receive a write request at the first adapter for writing data to the non-volatile storage object;

write data at the non-volatile memory of the first adapter when the request identifies the first adapter;

mirror the data at the second adapter using the mirror logical storage object at the second adapter at the second adapter, based on a write command data block generated by the first adapter and transmitted to the second adapter, when the request indicates that the data be mirrored;

receive a read request at the first adapter to read stored data;

determine by the first adapter from the read request that the read request identifies the second adapter;

generate a read command data block by the first adapter for the second adapter to retrieve the stored data from the second adapter; and provide the stored data to the computing device by the first adapter after receiving the stored data from the second adapter.

16. The system of claim 15, wherein, the write request includes a flag indicating that the data be mirrored at the second adapter.

17. The system of claim 5, wherein, when the non-volatile memory is configured as a flat address space, an offset value in the write request is translated to a logical block address for the first adapter identified by the write request.

18. The system of claim 15, wherein the non-volatile memory is configured as a block storage device.

19. The system of claim 15, wherein the non-volatile memory is configured as a flat address space.

20. The system of claim 15, wherein the logical storage object is a logical unit number (LUN) that is presented to the application.

21. The system of claim 15, wherein the first adapter is configured to handle both network and storage traffic.

\* \* \* \* \*